United States Patent
Button et al.

(10) Patent No.: US 12,314,714 B2
(45) Date of Patent: *May 27, 2025

(54) SEMANTIC FUNCTIONAL WRAPPERS OF SERVICES

(71) Applicant: Snowflake Inc., Bozeman, MT (US)

(72) Inventors: Tom L. Button, Medina, WA (US); Federico Zoufaly, Curridabat (CR)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,555

(22) Filed: Aug. 23, 2023

(65) Prior Publication Data

US 2023/0401058 A1 Dec. 14, 2023

Related U.S. Application Data

(63) Continuation of application No. 17/184,328, filed on Feb. 24, 2021.

(60) Provisional application No. 62/980,982, filed on Feb. 24, 2020.

(51) Int. Cl.
*G06F 8/76* (2018.01)
*G06F 8/75* (2018.01)
*G06F 9/54* (2006.01)

(52) U.S. Cl.
CPC .......... *G06F 8/76* (2013.01); *G06F 8/75* (2013.01); *G06F 9/541* (2013.01)

(58) Field of Classification Search
CPC ... G06F 8/76; G06F 8/75; G06F 9/541; G06F 2209/541
See application file for complete search history.

(56) References Cited

U.S. PATENT DOCUMENTS

| | | | |
|---|---|---|---|
| 8,381,191 B2* | 2/2013 | Mondal | G06F 8/70 713/177 |
| 8,910,163 B1* | 12/2014 | Grechishkin | G06F 9/45533 718/1 |
| 9,384,101 B2* | 7/2016 | Calvo | G06F 9/461 |
| 10,073,761 B2* | 9/2018 | Kidron | G06F 11/3698 |
| 10,620,990 B2* | 4/2020 | Bachelor | H04L 67/10 |
| 10,705,824 B2* | 7/2020 | Zhao | G06F 9/45512 |
| 11,789,726 B2 | 10/2023 | Button et al. | |

(Continued)

OTHER PUBLICATIONS

"U.S. Appl. No. 17/184,328, Advisory Action mailed Oct. 11, 2022", 3 pgs.

(Continued)

*Primary Examiner* — Matthew J Brophy
(74) *Attorney, Agent, or Firm* — Schwegman Lundberg & Woessner, P.A.

(57) ABSTRACT

Functional wrappers are scripts and related software that provide a way to group and invoke functionality comprising semantic intent in a legacy application. These functional wrappers allow programmatic access to functionality in legacy applications in contemporary software architectures without risk of porting errors. Additional functionality to provide features with presently expected, but not available at the time the legacy applications were developed, such as functional wrappers to provide parallelism and scaling, are disclosed. Finally, automatic generation of the functional wrappers are also disclosed.

20 Claims, 5 Drawing Sheets

(56) References Cited

U.S. PATENT DOCUMENTS

| | | | | |
|---|---|---|---|---|
| 2003/0115572 | A1* | 6/2003 | Zondervan | G06F 9/45512 717/109 |
| 2004/0223009 | A1* | 11/2004 | Szladovics | G06F 9/451 715/255 |
| 2005/0193380 | A1* | 9/2005 | Vitanov | G06F 9/451 717/115 |
| 2005/0223392 | A1* | 10/2005 | Cox | G06Q 10/06 719/328 |
| 2005/0257196 | A1* | 11/2005 | Hollander | G06F 9/45512 717/102 |
| 2009/0319979 | A1* | 12/2009 | Mondal | G06F 9/541 717/100 |
| 2010/0064033 | A1* | 3/2010 | Travostino | H04L 67/1097 709/220 |
| 2013/0031462 | A1* | 1/2013 | Calvo | G06F 9/461 715/234 |
| 2014/0215446 | A1* | 7/2014 | Araya | G06F 8/456 717/137 |
| 2014/0337821 | A1* | 11/2014 | Pilot | G06F 11/3688 717/124 |
| 2015/0234642 | A1* | 8/2015 | Araya | G06F 8/51 717/137 |
| 2016/0217058 | A1* | 7/2016 | Kidron | G06F 11/3698 |
| 2017/0123863 | A1* | 5/2017 | Erickson | G06F 9/54 |
| 2017/0139741 | A1* | 5/2017 | Bachelor | G06N 3/02 |
| 2019/0278639 | A1* | 9/2019 | Colmone | G06F 9/4484 |
| 2020/0241916 | A1* | 7/2020 | Bachelor | G06Q 10/06 |
| 2021/0263736 | A1 | 8/2021 | Button et al. | |

OTHER PUBLICATIONS

"U.S. Appl. No. 17/184,328, Final Office Action mailed Jun. 8, 2022", 22 pgs.

"U.S. Appl. No. 17/184,328, Non Final Office Action mailed Dec. 7, 2021", 21 pgs.

"U.S. Appl. No. 17/184,328, Non Final Office Action mailed Dec. 14, 2022", 21 pgs.

"U.S. Appl. No. 17/184,328, Notice of Allowance mailed Jun. 23, 2023", 10 pgs.

"U.S. Appl. No. 17/184,328, Response filed Mar. 2, 2022 to Non Final Office Action mailed Dec. 7, 2021", 18 pgs.

"U.S. Appl. No. 17/184,328, Response filed Mar. 30, 2023 to Non Final Office Action mailed Dec. 14, 2022", 20 pgs.

"U.S. Appl. No. 17/184,328, Response filed Aug. 31, 2022 to Final Office Action mailed Jun. 8, 2022", 18 pgs.

"U.S. Appl. No. 16/339,309, 312 Amendment filed Aug. 25, 2023", 11 pgs.

"U.S. Appl. No. 17/184,328, PTO Response to Rule 312 Communication mailed Sep. 12, 2023", 2 pgs.

* cited by examiner

SEMANTIC FUNCTIONAL WRAPPERS OF SERVICES

CROSS-REFERENCE TO RELATED APPLICATIONS

This patent application is a Continuation of U.S. patent application Ser. No. 17/184,328, entitled "Semantic Functional Wrappers of Services," filed on Feb. 24, 2021, which claims priority from U.S. Provisional Patent Application Ser. No. 62/980,982, entitled "Semantic Functional Wrapping of Services," filed on Feb. 24, 2020, which are hereby incorporated by reference in their entireties.

BACKGROUND

For decades, business processes have been automated with computer programs and systems, and enterprises have come to rely on such automation to the extent that the automated systems are seen by enterprise users as synonymous with the business process. In other words, the business process is defined by how the process was implemented by the software system in use. The encoded business process in software is called business logic.

However, computer platforms change with computing paradigms, and computing paradigms change rapidly. In one example, enterprise software from the 1980s and 1990s made use of two-tier client-server computing architectures. The client-server paradigm assumed that users would be desk-bound with dedicated personal computers with on-premise servers. In contrast, a common trend is for users to be mobile, to make use of lightweight internet protocols, and to have off-premise virtual machines running server-side software in the cloud. In general, computer architectures evolve over time, not only in response to progress in technology but also in response to user work patterns.

This relationship means that the process of updating businesses to adapt to new technology and work patterns includes porting the corresponding enterprise software (when deployed in production on an older architecture, known as a legacy system) to the new computing architecture. However, this can be both a prohibitively expensive and risky process. One of the reasons for these problems is the risk that the software port does not faithfully reimplement the business logic, with the concomitant risk that therefore the software port does not faithfully encode the business process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
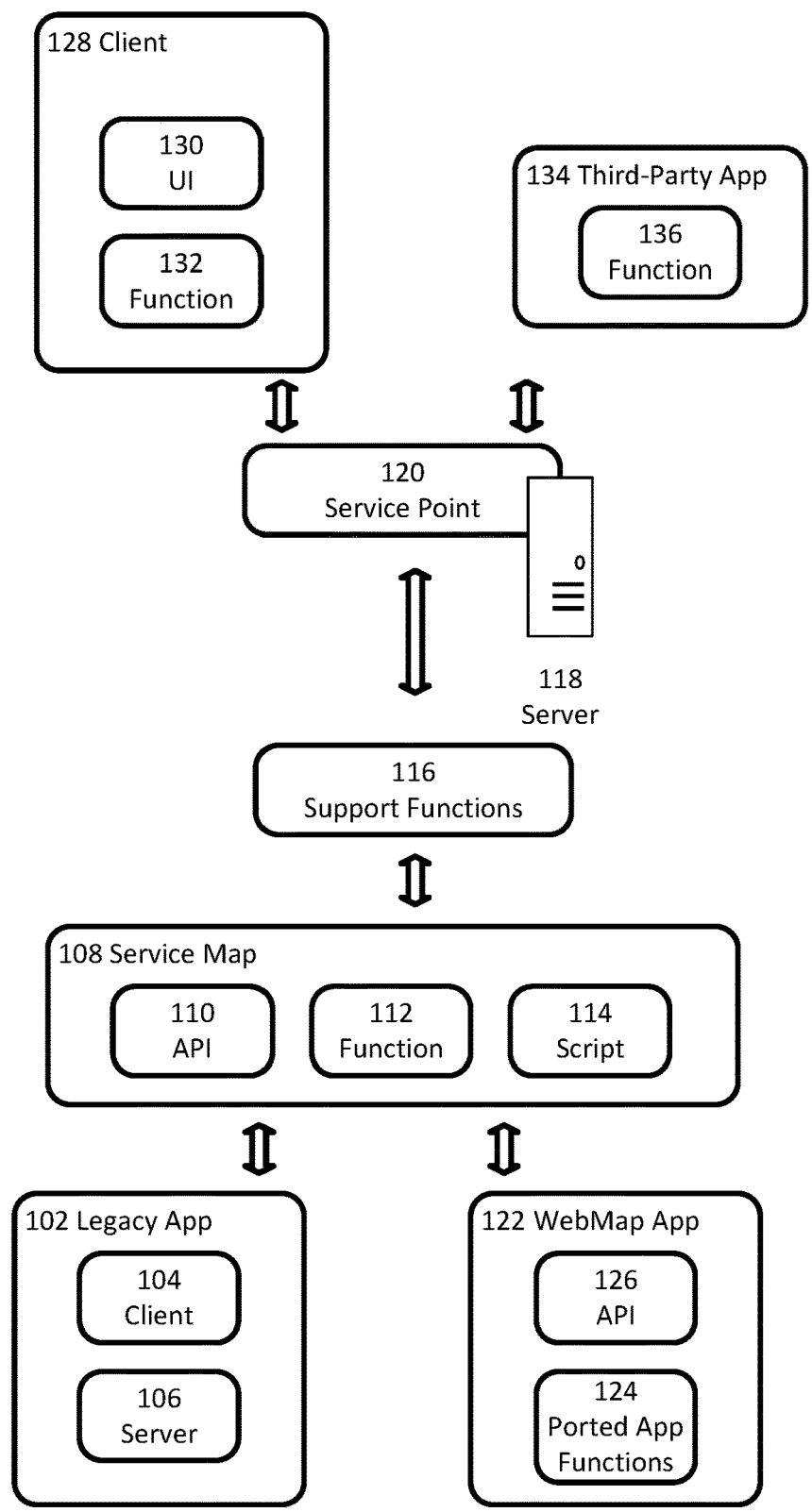
FIG. 1 is a context diagram of semantic functional wrappers of services.

Software Wrappers, Functional Wrapping, and Semantic Wrapping

The strategy herein to minimize or potentially eliminate inadvertent errors in porting legacy systems to new computer architectures is to make use of functional wrappers. A wrapper is a piece of computer code that when executed invokes a portion of a legacy software through the legacy user interface. Presently, computer software is subdivided into modules each of which exposes its respective functionality with an application programming interface (API) that may be invoked programmatically. In contrast, a wrapper, often in the form of an interpreted script, invokes user interface elements (sometimes called widgets and gadgets), such a text boxes, buttons, and drop-down menus, to perform a task.

One advantage of making use of wrappers is that the original legacy software continues to run as before, with no changes made. Accordingly, there is little to no risk of porting errors. Furthermore, porting costs are reduced since the legacy software is not being reimplemented.

Techniques to invoke user interface elements programmatically have been implemented via journaling hooks or alternatively via operating system APIs with user interface call intercept functionality. For the latter, examples include the Windows Management Interface (WMI) in the Win32 API and function in the Microsoft. Management. Interface namespace in Microsoft's .NET™ ("dot NET"). An advantage of making use of journaling hooks and/or operating system APIs is that prior techniques of invoking user interface elements involve simulating the actual user interface actions, such as a mouse click or a keystroke. However, the timing of receiving user interface actions can result in mis-entry and accordingly improperly performing functional wrappers. With journaling hooks and/or operating system APIs, functionality underlying the user interface element action may sometimes be directly accessed lowering the chances of mis-entry.

In the past, so-called "screen-scrapers" implemented a rudimentary form of wrappers. Specifically, mainframe computers that had text terminal user interfaces could be made to appear to have a graphical user interface (GUI) by intercepting calls to the text console library and rendering the user interface as a GUI on a personal computer.

Such screen-scrapers generally had wrappers with a one-to-one correspondence with user interface elements. Such wrappers can be components of a "virtual user interface" for the application. However, this gives rise to the notion of functional wrappers. A functional wrapper is a wrapper that captures not just an action with a single user interface element, but rather performs a business function as a series of interactions with one or more interface elements. For example, one business function might be to request a vacation. A functional wrapper called "leave_request(int, date, date)" might receive an invocation including the user ID and the start and end dates requested for leave. The functional wrapper might perform a series of user interface menu navigation steps to find a form for requesting leave. The functional wrapper might then perform a series of user interface steps to find and populate the user ID and leave requested data fields, followed by invoking a submit button. The function might then interpret the response in the form and thereafter return status or error indicators. In this way, a functional wrapper not only performs wrapper functions, but also maps a business logic intention (here requesting leave) to a series of user interface steps.

One observation is that legacy client-server applications were not necessarily architected for multiple concurrent users or with robust transactional support. Accordingly, performing operations in parallel, in different sessions, with different privileges/users, in a transacted manner (atomic, consistent, isolated, and durable operations are called transactions in computer science), are not necessarily natively supported by those legacy systems, or if they were, that functionality was not necessarily easily visible from the user interface. For example, there may have been a need to perform several different functions to hire a contractor. In this example, there might have been a process involving two functions, the first to request to obtain budget authority and the second to submit a job description. Both functions are needed to complete the process. However, both functions may be on different forms in the legacy system, may be associated with different user types, with different security and the functions may need to be transacted. The process may be considered a semantic intent; that is an abstract task that is composed of one or more functions.

Semantic intent arises in the context of interfacing a legacy system with a third-party application. Because the third-party application cannot be guaranteed to have functions that correspond one-to-one to functions corresponding to screen functions in the legacy system, a mapping of the interface requirements of the third-party system may be constructed to the functions in the legacy system. An interface requirement may be expressed as a semantic intent. The semantic intent may then be mapped to the one or more functions as implemented as wrappers in the legacy system.

Accordingly, beyond the notion of adding wrappers to user interface elements, we may build wrappers of functions of the legacy system and furthermore may build wrappers that subsume multiple functions of the legacy system corresponding to a semantic intent. We may call this implementing semantic functional wrappers around a legacy system. In this way, legacy systems may be ported to new computing platforms while ensuring that the underlying business process is not unintentionally changed during the porting process.

Context for Functional and Semantic Wrapping of Services

Unlike screen-scrapers which are designed to expose a user interface into a substantially similar user interface in a different rendering model (e.g. text interface rendered as a GUI), semantic functional wrappers are designed to expose business logic in the form of invocable functions. Accordingly, semantic functional wrappers expose server-side functionality and business logic functionality rather than the user interface functionality. To this end, we may refer to semantic functional wrapping of services, when we refer to wrapping of legacy systems.

Two-tier client-server legacy applications sometimes include business logic in the client-side leaving only persistence (e.g. database services) on the server-side. Accordingly, a semantic functional wrapper will access not only the server, but also the client, by virtue of invoking legacy system functionality via wrappers around the user interface.

FIG. 1 is a context diagram 100 for semantic functional wrappers of services. Legacy system application 102 may be any application that is not a cloud-based application, which accordingly requires a rearchitecting in order to port to a cloud infrastructure. Systems may include, legacy mainframe applications that expose their functionality through thin, text-based user interfaces, legacy two-tier client-server systems where business logic functionality resides in a personal computer client, and three-tier applications where business logic and persistence may reside on the server. In FIG. 1, a client 104 and a server 106 are illustrated, but a legacy system application 102 need not be limited to client-server applications.

A ServiceMap 108 contains the mapping of functions to user interface element steps. A ServiceMap 108 mapping includes a function 112 that corresponds to one or more actions invoking user interface elements in the legacy system application 102, usually via the client 104. The function includes a wrapper, usually in the form of an interpreted script, that holds the logic of how to invoke the respective user interface elements, how to handle errors and exceptions, and to generate a response for the wrapper.

The functions may in turn be exposed via a ServiceMap API 114 which enables the functions to be programmatically accessed. In one embodiment, the ServiceMap API 114 may provide a set of ServiceMap API functions one for each wrapper. However, in another embodiment, a ServiceMap API 114 may invoke one or more other API functions (or itself recursively), or multiple wrappers, thereby embodying logic for a semantic intent. In practice, the exposed ServiceMap API 114 will be some combination of function wrappers and semantic functional wrappers.

An API function in an API 114 need not only invoke wrappers but may also invoke functions in other applications. One application is a WebMap application 122 where the hard work of porting the legacy system application 102 has been separated into software components suitable for a web application in a web page to cloud architecture. In one embodiment, the software components have been separated into a model-view-view-model (MVVM) architecture. Each software component has its own functions 124 which in turn are exposed outside of the WebMap application 112 as a WebMap API 126. As with the ServiceMap API 114, a WebMap API 126 is comprised of one or more APIs each of which may embody one or more functions and may invoke other functions and indeed other software systems. Accordingly, in some embodiments, a ServiceMap API function in a ServiceMap API 114 may invoke one or more WebMap API functions 126 as well.

As described above, a legacy system application 102 may not have originally implemented functionality supporting present-day programming best practices or user work patterns. Accordingly, support functions 116 are comprised of one or more software components that may be invoked by the ServiceMap APIs 114. Example software components include but are not limited to: identity servers for security, user profiles, and access control; transaction monitors to provide support for atomic, consistent, isolated, and durable transactions; state management and execution sequencing guarantees; and session management. In some embodiments, to ensure consistent versioning of services, the support functions 116 may be encapsulated and deployed as a single software component (sometimes called a "core functions" software component). Specifically, within a ServiceMap API 114, programmatically invoking support functions 116 provides functional support for programming best practices or user work patterns not supported by the legacy system application 102 itself.

Regarding versioning, software component, functional wrappers, and the like encapsulate functionality corresponding to a semantic intent. The implementation of that functionality may evolve over time. Since the software components and/or functional wrappers encapsulate a particular version, a version indicator that uniquely identifies version, such as a version number, may be associated with the software component and/or functional wrapper. The ServiceMap may then select a software component and/or functional wrapper based at least on the version number.

One specific support function is the notion of a Semantic Service Management layer. Because some legacy applications are client-server applications that were originally architected with assumptions about concurrent users and sessions, often the wrapper client-server applications need a reset between calls. The Semantic Service Management layer intervenes between incoming function invocation requests and the actual exposed services to perform this service management function. The Semantic Service Management layer is described in further detail in the Appendix and with respect to FIG. 5. The ServiceMap API 114 functionality may reside on one or more web servers 118. Servers may be physical or virtual and are described in more detail with respect to FIG. 2.

In addition to hosting the ServiceMap API 114, web servers 118 may also host service points 120. A service point 120 is an entry point for an application to programmatically invoke a ServiceMap API 114 using internet protocols. Service points 120 generally have a one-to-one mapping to the ServiceMap APIs 114 with a primary function of receiving requests, dispatching those received requests to the relevant ServiceMap API 114, and then serving the response based on the response from the relevant ServiceMap API 114. In some embodiments, service points may be implemented as node.js web services and may be architected as one or more microservices.

Above we have referenced the notion of external applications. Here, we mean applications that are external to the cloud and which access the ServiceMap API 114 via service points 120. A typical external application may be a client application 128 with a user interface 130. The user interface often is a web application, where a user invokes one or more external client application functions 132 via the user interface 130. Those client application function 132 in turn invoke the relevant service points 120. Note that these functions 132 of the client application 128 vary in complexity and accordingly may be business functions or semantic functions. In the web application embodiment, an invocation to a service point 120 may be mediated by a web server. Specifically, the web server may receive a request to invoke the service point 120, which in turn queues and dispatches the received request to the relevant service point 120. After the service point 120 executes, the generated response is sent to the webserver to forward back to the client application 128. In this embodiment, the external client application 128 may include a web browser or web browser functionality to support the internet protocols.

Where external client application 128 is a user-driven application, other external applications include external third-party applications 134, where the functionality may simply be an automated call. Examples are where a third-party application is either delegating functionality or making a request for information. As with the external client application 128, the external third-party applications 138 will have their own functions 136 that are either business functions or semantic functions. Upon the external third-party application 134 invoking a third-party application function 136, similarly to the external client application 128, the third-party application function 136 calls the relevant service point 120, either via a mediating web server or directly to the service point 120.

In this way, functions of a legacy system application 102 are captured via a ServiceMap 108 whose APIs 114 encode functions and potentially semantic functions. Since the ServiceMap APIs 114 have access to support functions 116, the ServiceMap APIs 114 may implement system functionality for current best practices and user work patterns not originally implemented in the legacy system application 102. Those ServiceMap APIs 114 are then exposed to external applications such as an external client application 128 or external third-party application 134 via service points 120 thereby completing the access pathway for the functional and semantic wrappers.

Exemplary Environment for Semantic and Functional Wrapping of Services

Figure 2:
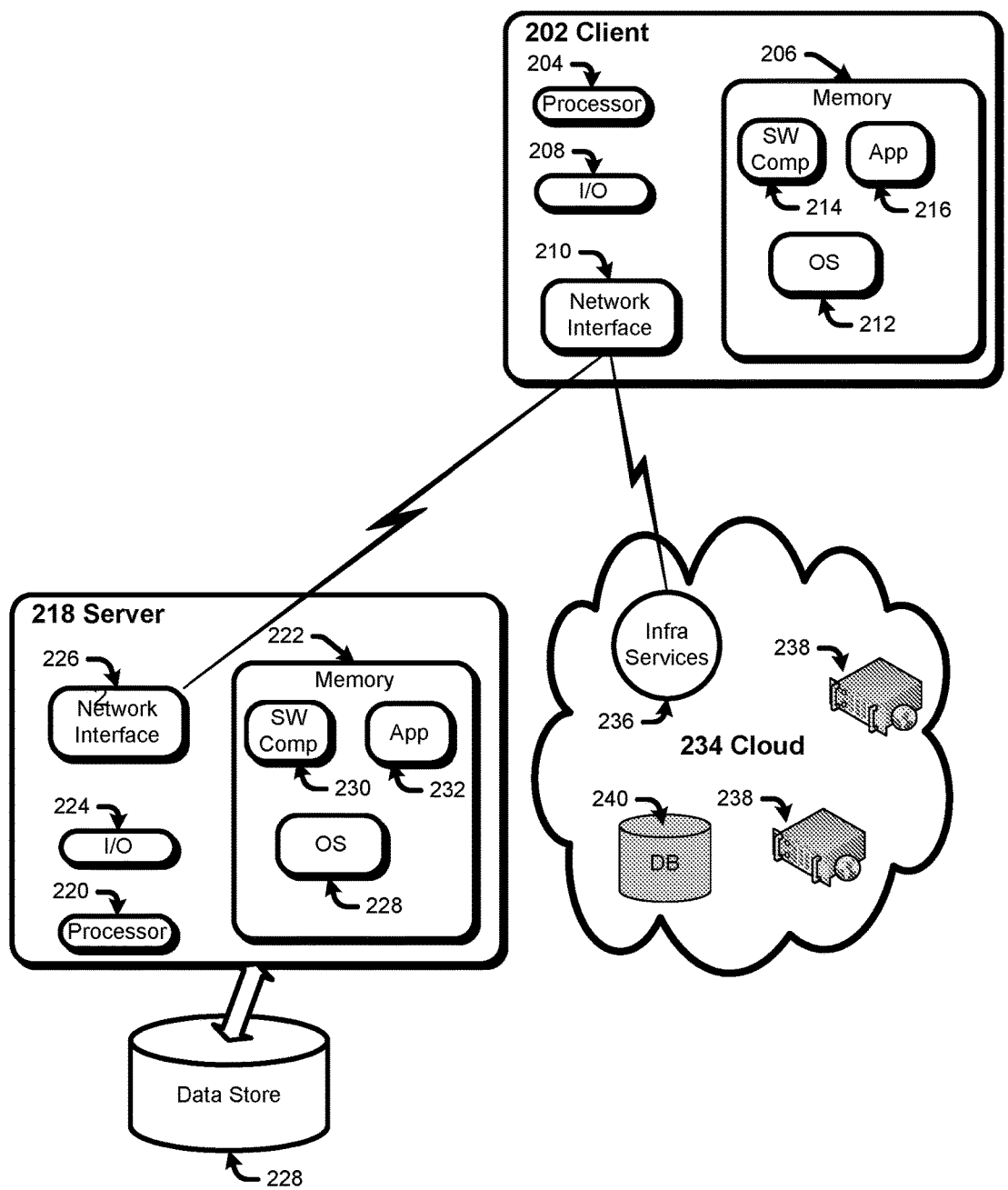
FIG. 2 is an exemplary hardware, software, and network environment diagram for semantic functional wrappers of services.

Before describing an exemplary platform for semantic and functional wrapping of services, it is useful to describe an exemplary hardware, software, and communications environment. FIG. 2 is a block diagram 200 of one such environment.

The functionality for semantic functional wrapping of services is generally hosted on computing devices. Exemplary computing devices include without limitation on the client-side: mobile devices (including smartphones), tablet computers, laptops, desktop personal computers, and kiosks. Exemplary computing devices on the server-side include without limitation: mainframes, physical servers, and virtual machines. Generally, the computing devices are to be networked.

A client-side computing device 202 or "client" for short may have a processor 204, a memory 206. The processor may be a central processing unit, a repurposed graphical processing unit, and/or a dedicated controller such as a microcontroller. The computing device may further include an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O interface 208 and may be a network interface card supporting Ethernet and/or Wi-Fi and/or any number of other physical and/or datalink protocols. Alternatively, the network interface 210 may be an interface to a cellular radio (not shown).

Memory 206 is any computer-readable media that may store several software components including an operating system 212 and software components 214 and/or other applications 216 including an internet browser or application integrating internet browsing capability. In general, a software component is a set of computer-executable instructions stored together as a discrete whole. Operating systems 212 and applications 216 are themselves software components or integrated aggregations of software components. Examples of software components 214 include binary executables such as static libraries, dynamically linked libraries, and executable programs. Other examples of software components 214 include interpreted executables that are executed on a run time such as servlets, applets, p-Code binaries, and Java binaries. Software components 214 may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media.

The server-side computing device 218, or "server" for short is any computing device that may participate in a network. The network may be, without limitation, a local area network ("LAN"), a virtual private network ("VPN"), a cellular network, or the Internet. The server 218 has hardware components analogous to the client-side computing device 202. Specifically, it will include a processor 220, a memory 222, an input/output interface 224, and/or a network interface 226. In the memory 222 will be an operating system 228, software components 230, and applications 232. Server 218 differs from client hardware in that processing power is generally more powerful to handle concurrent processes running and network capacity is greater to communicate with multiple clients. Server-side software components 230 may include libraries and runtimes (e.g. to run interpreted code). Server-side applications 232 may include not only web servers (also called "application servers") and database servers, but also server software providing functionality not typically found in legacy system applications 102. Example server software may include transaction monitors, single sign-on servers, identity servers, security servers (including access control list (ACL) functionality), and network session managers (which enable multiple concurrent sessions on a legacy system application 102).

In general, semantic functional wrappers around services may be implemented as a software service on a physical server 218. However, such a software service may also be hosted on the cloud 234 via a cloud service 236. Specifically, a cloud service 236 is comprised of multiple physical computer servers which are disaggregated via a hypervisor (not shown). The physical computer servers each may have one or more processors, memory, at least I/O interface, and/or network interface. The features and variations of the processors, memory, the I/O interface, and the network interface are substantially similar to those described for the physical server 218 described above.

A cloud service 236 includes a hypervisor (not shown) which can delegate calls to any portion of hardware in the underlying physical serves, and upon request generates a virtual machine from the separate portions of hardware, regardless of physical server (a process called "disaggregation"). Just as a physical server 218, a virtual machine may host not only software applications, components including services, but also virtual web servers 238 functionality and virtual storage/database 240 functionality.

Note that virtual machines themselves may be further partitioned into containers, which enable execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned.

The cloud service 236 may embody an abstraction of services. Common examples include service abstractions such as Platform as a Service ("PAAS"), Infrastructure as a Service ("IAAS"), and Software as a Service ("SAAS").

Generation of Semantic Functional Wrappers for Services

Figure 3:
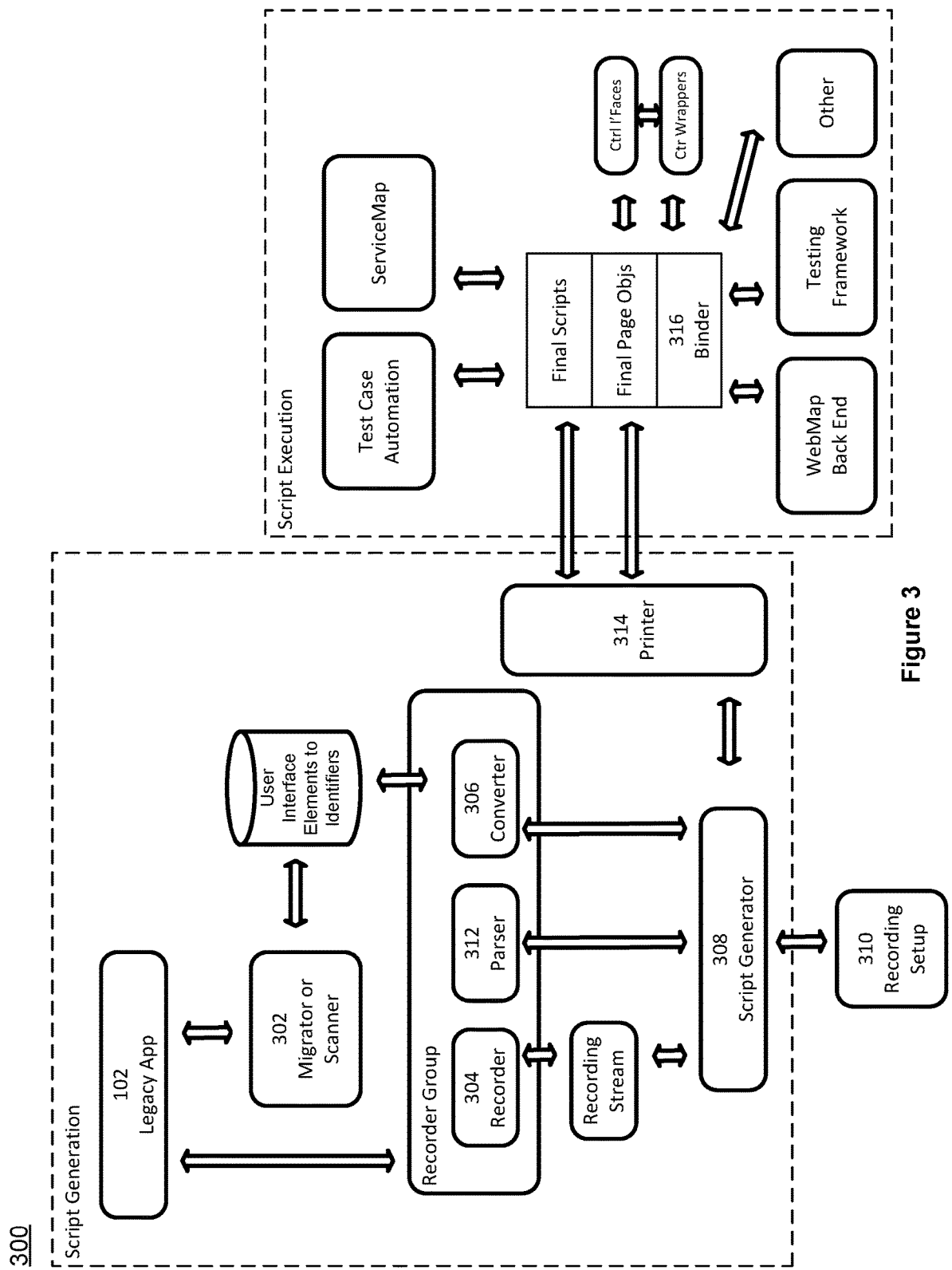
FIG. 3 is a block diagram of an exemplary workflow to generated functional wrappers.

Prior to the execution of functional and semantic wrappers of services, is the generation of the wrappers in the first place. Note that functional wrappers, semantic or otherwise may be generated either by human analysis and architecting or alternatively by machine learning techniques in observing human workers for example via robot process automation techniques. FIG. 3 is a block diagram 300 describing the generation of wrappers. Execution of wrappers is described in further detail with respect to FIG. 4.

In one embodiment, the generation of wrappers can be understood as the collection of the following inputs: (1) identification and enumeration of user interface elements, (2) collection of user actions on user interface elements in the context of a function (e.g. a task) and (3) receiving of environmental and setup variables as configuration for the collection of user actions.

Turning to FIG. 3, the identification and enumeration of user interface elements are performed by a migrator (also called a "scanner") 302. The migrator 302 performs static analysis of the source code (also called "scanning") to identify forms, and user interface elements associated with the forms. The migrator 302 also identifies other user interface elements to navigate to and from forms as well as intermediate dialogs such as login screens. Specifically, the migrator 302 parses the source code, extracts identifiers (e.g. object instance names or handles) of user interface objects as to be able to bind journaling hooks, or otherwise to identify running instances via operating system APIs. In some cases, an architect may provide pre-extracted identifiers that act as a preliminary map data file that can provide either as cross-checks or as "hints" to the migrator 302. Specifically, the preliminary map data file contains a list of candidate user interface names or symbols that act as identifiers to bind to functionality. In this way, the migrator 302 need not fully rely on class types and static analysis to identify user interface identifiers.

The collection of user interface actions on the user interface elements is accomplished via a set of recording functions. First, there is a recorder 304 which observes the activity of a legacy system application 102 during run-time and records those actions. Then, there is a recording converter 306, communicatively coupled to the recorder 304. The recording converter 306 maps user interface identifiers from the static analysis of the migrator 302 with the recording stream recorded by the recorder 304. Because the recorder may only have run-time names and addresses of user interface objects, the recording converter 306 binds static identifiers, including human-readable names of user interface elements. The result of the recording converter 306 is an artifact in the form of a preliminary software data map called a pre-log storing the recording with the user interface elements mapped to identifiers.

The recorder 304 and the recording converter 306 do not operate in isolation. Rather, a script generator 308 is communicatively coupled with the recorder 304, the recording converter 306, and a recording parser 312 which provides parsing functions on the pre-log. The script generator 308 also receives a recording setup 310 comprising a preliminary software data file which contains the configuration information such as environmental variables and recording parameters. Specifically, the recording setup 310 specifies what to record, how to record it, and for how many iterations. Upon receipt, the script generator 308 causes the recorder 304 to record. Upon completion of recording, the pre-log is generated by the recording converter 306.

Note that the pre-log is designed to capture recorded tasks, but it is not yet in the form of a script. Accordingly, the script generator 308 reads the pre-log via a recording parser 312, and then converts the pre-log into a script in a pre-determined language such as JavaScript or Python. Upon generation, a printer 314 publishes the generated script to a well-known directory. The printer 314 may also encode metadata, such as date/time and name of the task in the form of comments in the generated script headers.

Note that deployment of a script includes several artifacts. There is a repository (or well-known directory) of final scripts as generated by the script generator. There is also a repository of final page objects corresponding to user interface elements in the legacy system application 102. The final page objects are mapped to a set of control interfaces which comprise the means to invoke the respective user interface element, and to a set of control wrappers which programmatic expose the respective control interfaces for execution. The set of final page objects, the control interfaces, and the control wrappers are sometimes referred to as a "virtual user interface (UI)." The mapping is managed by a software component called a binder 316. Specifically, the binder is a software map that maps the user interface elements to control wrappers. For discussion purposes, functional wrapper and semantic wrapper will include not only the generated script, but also the associated page objects, control interfaces, and control wrappers.

Execution of Semantic Functional Wrappers for Services

Figure 4:
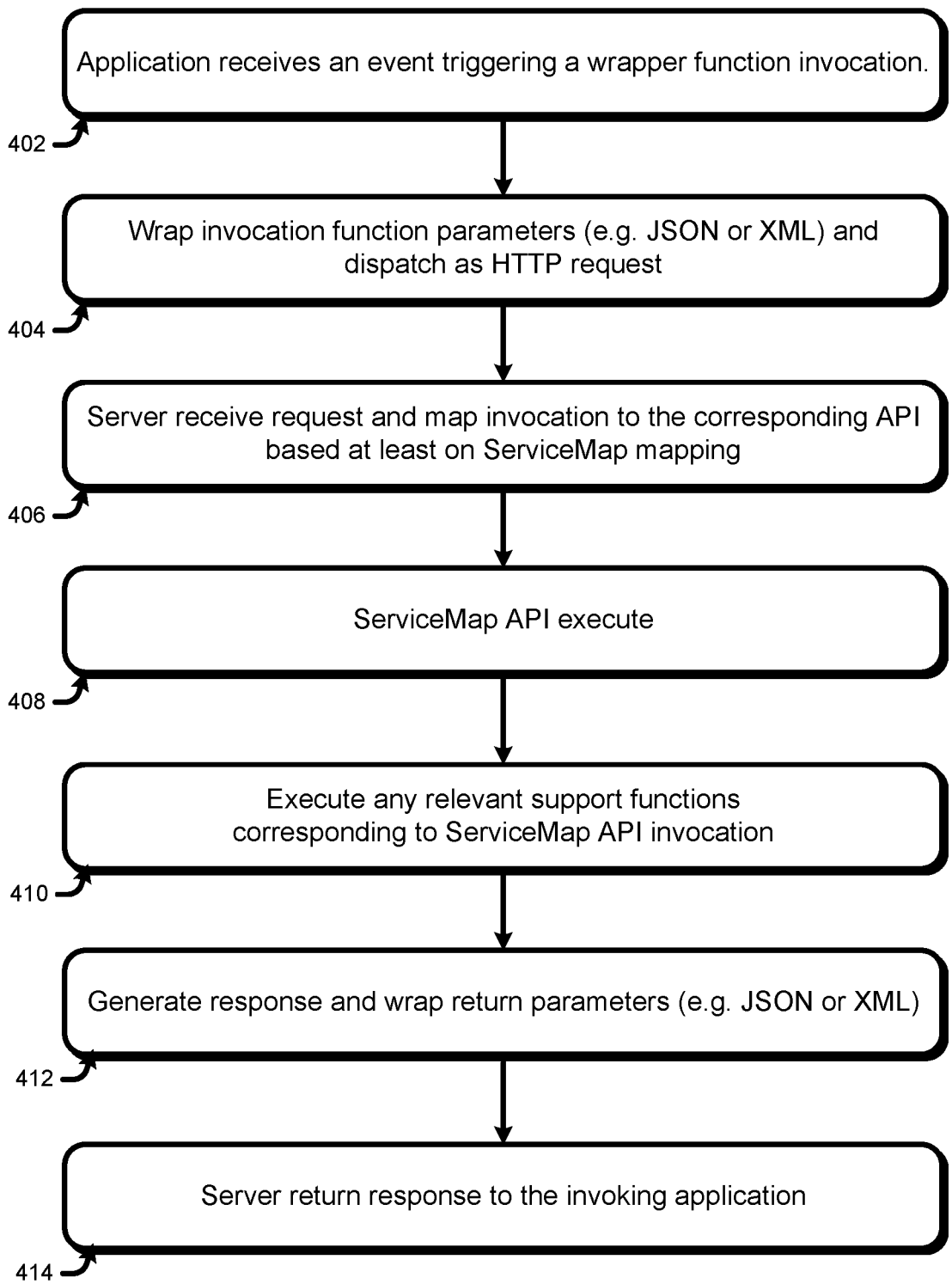
FIG. 4 is a flow chart of an exemplary process to invoke functional wrappers.

Once the generated scripts are deployed and mapped to page objects and their respective control interfaces and control wrapper, the functional collection can be considered a functional wrapper. Depending on whether the scope of the functional wrapper is via business logic or semantic logic, we can refer to the wrapper as a functional wrapper or a semantic wrapper. FIG. 4 is a flow chart 400 of executing functional/semantic wrappers.

In block 402 a client application 128 or a third-party application 134 receive an event where the wrapped legacy system application 102 is to be invoked. The event handler in the application 128, 134 contains code to call a service point 120 corresponding to an API 110 in the ServiceMap 108 of the wrapped legacy system application 102. In block 404, if the service point 120 is running as a web service, the event handler wraps the parameters as HTTP parameters or as a structured text file such as JSON or XML, and then forwards the invocation as an HTTP request.

Upon receiving the request, in block 406 a web server 118 identifies the correct API 110 to dispatch the request to, unpacks the received parameters, and invokes the API 110. The dispatching will be based on the ServiceMap 108 mapping. The invocation may be blocking or unblocking as set by HTTP parameters.

Note that the web server 118 may be specific to a particular technology stack. For example, a web server 118 may be specific to Microsoft .NET or alternatively to Java. This is particularly relevant for the use case of invoking WebMap applications that are already code separated. Specifically, since a WebMap application is already ported, the ServiceMap functionality is not used and any API of the WebMap application may be directly invoked.

In block 408, the ServiceMap API 110 executes one or more scripts previously generated corresponding to the desired function. During the execution of the scripts, any referenced page objects are identified and via the binder 316 the respective control interface and wrappers are invoked.

Upon invocation of the control interfaces, in block 410, the support functions 116 may monitor and modify the execution of functionality in the underlying legacy system application 102. One support function 116 includes track the execution of steps and ensuring that the order of steps is correct. Another support function 116 is to introduce a transaction monitor. Other support functions 116 may include session management, identity management, access control, and the like.

In block 412, the functionality in the underlying legacy client application is invoked and a response is generated. In some embodiments, the response is generated as a structured text file such as in JSON or XML. The response is returned to the web server 118. Note that the response may include both successful responses, such as a data set (or reference to a data set) or may provide error messages.

In block 414, the web server 118 returns the response to the invoking client application 128 or third-party application 134. If the HTTP call was initially blocked, the response is simply returned as part of an HTTP response. If the HTTP call was initially unblocked, a response HTTP request is initiated, and the response pushed back to the application 128 and 134.

Exemplary Use Cases for Semantic Functional Wrapping of Services

The use case thus far described is in the porting of a legacy system application 102 in such a way to limit the risk of changing business logic. However, the process to generate wrappers and the execute wrappers gives rise to other use cases, specifically in the realm of formal methods, as follows.

Recall that script recording is according to a pre-existing business function or task. While scripts have long been used to replicate human action as part of testing, note that the scripts also capture the semantics of the underlying business process as encoded in the legacy system application 102. Accordingly, the script generator 308 need not generate a test script. Rather, the script generator 308 may generate a formal description of the business process. An example representation would be to generate BPEL (Business Process Execution Language). Once generated, the BPEL artifact could be used for several purposes: (1) generation of formal documentation of the business process (as opposed to relying on the encoded legacy system application); (2) statically checking the BPEL for completeness, errors, and consistency; (3) generating governance, regulatory and compliance documentation about systems.

The key insight is that many legacy system applications 102 are not documented or are under-documented. As a result, the legacy system application 102 becomes the final arbiter as to what the underlying business process is. This is less than ideal because it limits the ability of an enterprise to adapt business processes and constrains evolution to what is possible in the legacy system application 102. Accordingly, as one more use case, the generated BPEL could be used as a set of hints when the time comes to port the ServiceMap application into a WebMap application, or ultimately could be used as the basis of generated a new application altogether.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX—SEMANTIC SERVICES MANAGEMENT LAYER

Figure 5:
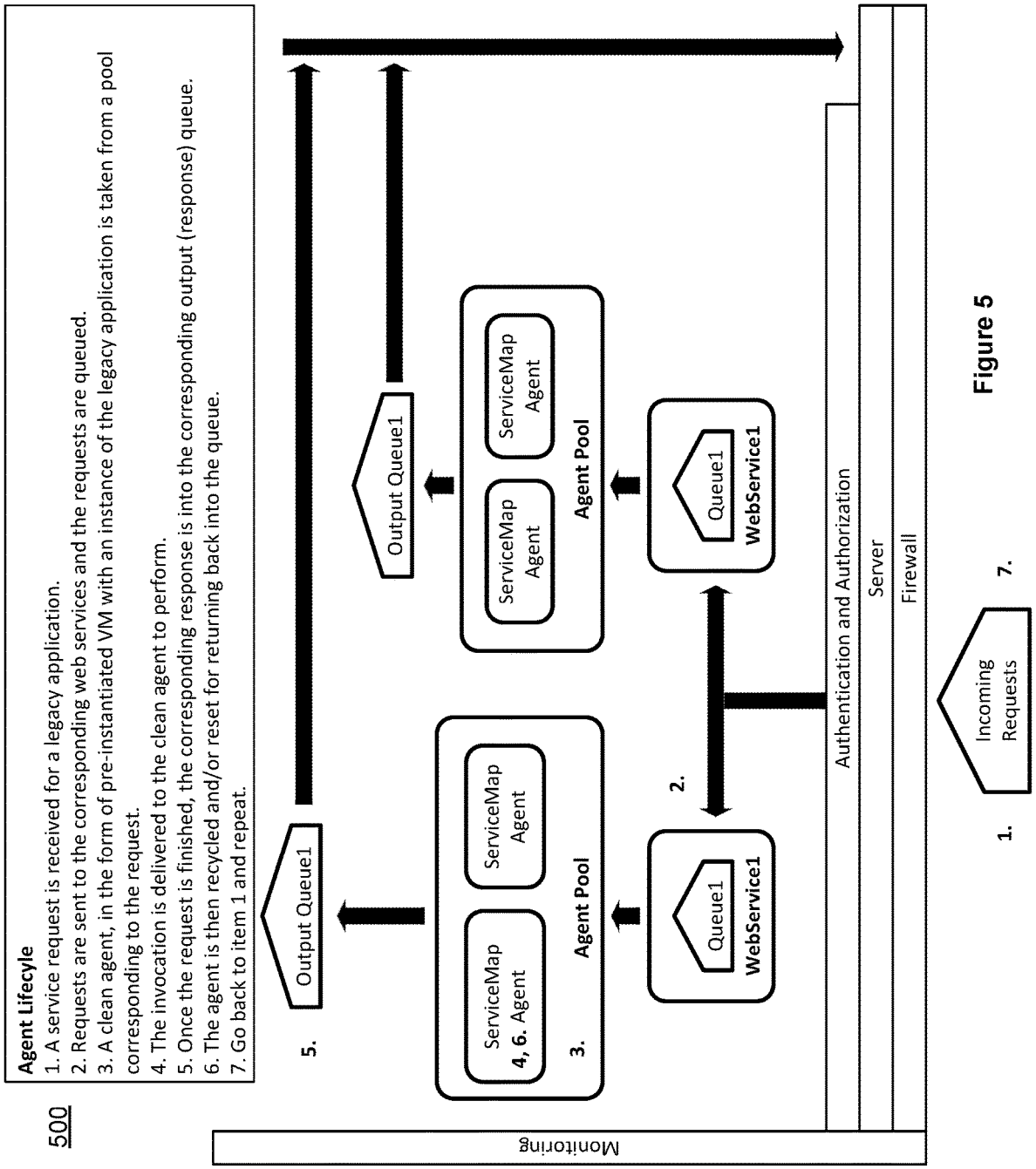
FIG. 5 is a block diagram illustrating a semantic services management layer/software component.

As described above with respect to FIG. 1, semantic functional wrappers wrap legacy applications. Certain classes of legacy applications make use of specific support functions. In the case of client-server applications, sometimes to clear state, to manage concurrency or to ensure proper function, the legacy application requires a reset. A Semantic Services Management layer performs this reset function. FIG. 5 illustrates one embodiment of a Semantic Services Management layer.

Specifically, FIG. 5 illustrates the interaction between a legacy application and the exposed Semantic Service (including the semantic wrappers described above). A web or application server publishes a set of Semantic Services which may correspond either to individual API calls or bundles/programming interfaces of API calls. Such Semantic Services may be executed by a pool of agents. Since the original legacy client-server application being wrapped may have a user interface that is "scraped," in this scenario it is in effect a stateful mono-user application. Accordingly, for concurrency of users and/or sessions, the application has to be "reset" to clear state prior to the execution of at least some Semantic Services.

In some implementations, an agent may be implemented as a full virtual machine. However, due to the configuration and provisioning lag time of a virtual machine, an instance may be implemented on a container instead.

The result is a pool of agents (in either VMs or containers) that are available and ready to serve the Semantic Services. Once a Service Operation is completed, an agent is "recycled" thereby resetting the state. The number of agents in the pool is a function of the expected number of concurrent users. Also, the agent pool manages the lifecycle of the agents (see the cycle in FIG. 5).

Other support function may be situated at the server level, Specifically, multiple services may be added as part of the management of the Semantic Services, including but not limited to an identity management mechanism that isolates the original identity in the application with the new identity that is managed by the Semantic Service. Additionally, there are monitoring services on the health of the agent pool.

Scalability for this solution is achieved by making the agent pool larger or smaller depending on the number of expected calls. Since we are talking client-server applications, the number of concurrent users is normally in the 10s or 100s maybe 1000s but certainly not in the millions.

What is claimed is:

1. A system comprising:
a processor; and
a memory communicatively connected to the processor, the memory being configured to store computer-executable instructions that when executed by the processor, causes the processor to perform operations comprising:
analyzing, by a script generation software application, a legacy application to identify user interface elements of the legacy application, the analyzing of the legacy application comprising performing a static analysis, the static analysis comprising parsing source code of the legacy application to identify one or more object instance names of user interface objects for the user interface elements based on one or more user interface identifier class types, the one or more user interface elements enabling navigation to and from one or more forms of the legacy application;
analyzing, by the script generation software application, usage of the legacy application to identify a functionality of the legacy application corresponding to a semantic intent, the semantic intent mapping one or more user interface requirements of a non-legacy application to one or more first functions of the legacy application, the analyzing of the usage of the legacy application comprising performing a dynamic analysis that records usage activity of a running instance of the legacy application using the one or more object instance names and one or more addresses of the user interface objects, wherein one or more second functions of the non-legacy application lack at least one one-to-one correspondence with the one or more first functions of the legacy application;
generating, by the script generation software application, virtual user interface elements that comprise the user interface elements of the legacy application, a set of control interfaces for invoking the user interface elements, and wrappers of the user interface elements for exposing the user interface elements for execution;
generating, by the script generation software application, a software map that maps the user interface elements of the legacy application to the functionality of the legacy application; and
generating, by the script generation software application, one or more scripts based at least on the user interface elements as wrapped by the virtual user interface elements and the functionality of the legacy application.

2. The system of claim 1, wherein at least one script of the one or more scripts is configured to invoke at least one of the user interface elements by at least one of a journaling hook or an operating system API.

3. The system of claim 1, wherein the operations comprise receiving, at the script generation software application, a preliminary map data file of potential user interface elements, and wherein the static analysis is based at least on the preliminary map data file.

4. The system of claim 1, wherein the dynamic analysis comprises:
extracting, by the script generation software application, user interface elements invoked during run time; and
mapping, by the script generation software application, user interface elements identified during static analysis to user interface elements identified during the dynamic analysis.

5. The system of claim 4, wherein the operations comprise receiving a preliminary software data map, the performing the dynamic analysis comprising performing the dynamic analysis based at least on one or more of setup variables or environmental variables that are included in the preliminary software data map.

6. The system of claim 4, wherein the operations comprise receiving a preliminary recording setup data file, the performing of the dynamic analysis comprising performing the dynamic analysis based at least on pre-identified sets of functionality corresponding to the semantic intent, the preliminary recording setup data file comprising the semantic intent, the semantic intent being used by the script generation software application to generate a script that corresponds to each semantic intent of the preliminary recording setup data file.

7. The system of claim 6, wherein the operations comprise deploying the generated scripts by storing, in a repository, at least one generated script, the wrappers of the user interface elements, and the software map.

8. A computer-implemented method comprising:
analyzing, by a script generation software application, a legacy application to identify user interface elements of the legacy application, the analyzing of the legacy application comprising: performing a static analysis, the static analysis comprising parsing source code of the legacy application to identify one or more object instance names of user interface objects for the user interface elements based on one or more user interface identifier class types, the one or more user interface elements enabling navigation to and from one or more forms of the legacy application;
analyzing, by the script generation software application, usage of the legacy application to identify a functionality of the legacy application corresponding to a semantic intent, the semantic intent mapping one or more user interface requirements of a non-legacy application to one or more first functions of the legacy application, the analyzing of the usage of the legacy application comprising performing a dynamic analysis that records usage activity of a running instance of the legacy application using the one or more object instance names and one or more addresses of the user interface objects, wherein one or more second functions of the non-legacy application lack at least one one-to-one correspondence with the one or more first functions of the legacy application;
generating, by the script generation software application, virtual user interface elements that comprise the user interface elements of the legacy application, a set of control interfaces for invoking the user interface elements, and wrappers of the user interface elements for exposing the user interface elements for execution;
generating, by the script generation software application, a software map that maps the user interface elements of the legacy application to the functionality of the legacy application; and
generating, by the script generation software application, one or more scripts based at least on the user interface elements as wrapped by the virtual user interface elements and the functionality of the legacy application.

9. The computer-implemented method of claim 8, wherein at least one script of the one or more scripts is configured to invoke at least one of the user interface elements by at least one of a journaling hook or an operating system API.

10. The computer-implemented method of claim 8, comprising receiving, at the script generation software application, a preliminary map data file of potential user interface elements, and wherein the static analysis is based at least on the preliminary map data file.

11. The computer-implemented method of claim 8, wherein the dynamic analysis comprises:
extracting, by the script generation software application, user interface elements invoked during run time; and
mapping, by the script generation software application, user interface elements identified during static analysis to user interface elements identified during the dynamic analysis.

12. The computer-implemented method of claim 11, comprising receiving a preliminary software data map, the performing the dynamic analysis comprising performing the dynamic analysis based at least on one or more of setup variables or environmental variables that are included in the preliminary software data map.

13. The computer-implemented method of claim 11, comprising receiving a preliminary recording setup data file, the performing of the dynamic analysis comprising performing the dynamic analysis based at least on pre-identified sets of functionality corresponding to the semantic intent, the preliminary recording setup data file comprising the semantic intent, the semantic intent being used by the script generation software application to generate a script that corresponds to each semantic intent of the preliminary recording setup data file.

14. The computer-implemented method of claim 13, comprising deploying the generated scripts by storing, in a repository, at least one generated script, the wrappers of the user interface elements, and the software map.

15. One or more non-transitory computer-readable media storing computer-executable instructions that upon execution cause one or more processors to perform operations comprising:
analyzing, by a script generation software application, a legacy application to identify user interface elements of the legacy application, the analyzing of the legacy application comprising performing a static analysis, the static analysis comprising parsing source code of the legacy application to identify one or more object instance names of user interface objects for the user interface elements based on one or more user interface identifier class types, the one or more user interface elements enabling navigation to and from one or more forms of the legacy application;
analyzing, by the script generation software application, usage of the legacy application to identify a functionality of the legacy application corresponding to a semantic intent, the semantic intent mapping one or more user interface requirements of a non-legacy application to one or more first functions of the legacy application, the analyzing comprising performing a dynamic analysis that records usage activity of a running instance of the legacy application using the one or more object instance names and one or more addresses of the user interface objects, wherein one or more second functions of the non-legacy application lack at least one one-to-one correspondence with the one or more first functions of the legacy application;
generating, by the script generation software application, virtual user interface elements that comprise the user interface elements of the legacy application, a set of control interfaces for invoking the user interface elements, and wrappers of the user interface elements for exposing the user interface elements for execution;
generating, by the script generation software application, a software map that maps the user interface elements of the legacy application to the functionality of the legacy application; and
generating, by the script generation software application, one or more scripts based at least on the user interface elements as wrapped by the virtual user interface elements and the functionality of the legacy application.

16. The one or more non-transitory computer-readable media of claim 15, wherein at least one script of the one or more scripts is configured to invoke at least one of the user interface elements by at least one of a journaling hook or an operating system API.

17. The one or more non-transitory computer-readable media of claim 15, wherein the operations comprise receiving, at the script generation software application, a preliminary map data file of potential user interface elements, and wherein the static analysis is based at least on the preliminary map data file.

18. The one or more non-transitory computer-readable media of claim 15, wherein the operations comprise receiving, at the script generation software application, a preliminary map data file of potential user interface elements, and wherein the static analysis is based at least on the preliminary map data file.

19. The one or more non-transitory computer-readable media of claim 15, wherein the dynamic analysis comprises:
   extracting, by the script generation software application, user interface elements invoked during run time; and
   mapping, by the script generation software application, user interface elements identified during static analysis to user interface elements identified during the dynamic analysis.

20. The one or more non-transitory computer-readable media of claim 19, wherein the operations comprise receiving a preliminary software data map, the performing the dynamic analysis comprising performing the dynamic analysis based at least on one or more of setup variables or environmental variables that are included in the preliminary software data map.

* * * * *